(12) United States Patent (10) Patent No.: US 12,651,319 B2
Talagala et al. (45) Date of Patent: Jun. 9, 2026

(54) DETERMINING AN ESTIMATED NOISE VALUE FOR A PIXEL INTENSITY VALUE IN A SET OF IMAGE DATA

(71) Applicant: Arm Limited, Cambridge (GB)

(72) Inventors: Dumidu Sanjaya Talagala, Coventry (GB); David Hanwell, Sale (GB)

(73) Assignee: Arm Limited, Cambridge (GB)

( * ) Notice: Subject to any disclaimer, the term of this patent is extended or adjusted under 35 U.S.C. 154(b) by 31 days.

(21) Appl. No.: 18/774,004

(22) Filed: Jul. 16, 2024

(65) Prior Publication Data

US 2025/0029215 A1     Jan. 23, 2025

(30) Foreign Application Priority Data

Jul. 17, 2023 (GB) ..................................... 2310942

(51) Int. Cl.
*H04N 5/335* (2011.01)
*G06T 5/70* (2024.01)
*G06V 10/60* (2022.01)

(52) U.S. Cl.
CPC ................ *G06T 5/70* (2024.01); *G06V 10/60* (2022.01)

(58) Field of Classification Search
CPC ...................................................... H04N 25/62
See application file for complete search history.

(56) References Cited

U.S. PATENT DOCUMENTS 9,819,849 B1 * 11/2017 Rivard ................. H04N 25/683
2021/0158486 A1 * 5/2021 Tohme ..................... G06T 5/60

OTHER PUBLICATIONS

Combined Search and Examination Report dated Jan. 24, 2024 for GB Application No. GB231092.4.

* cited by examiner

*Primary Examiner* — Gary C Vieaux
(74) *Attorney, Agent, or Firm* — EIP US LLP

(57) ABSTRACT

A method of image processing. The method comprises obtaining a set of image data, the set being associated with one or more parameters representative of one or more image capture characteristics for the set and comprising pixel intensity values representing image pixels having respective pixel locations in an image. The method comprises, for a given pixel intensity value in the set: determining an estimated noise value based on at least: the one or more parameters associated with the set, and a representative intensity value derived from one or more pixel intensity values in the set. The method comprises associating the estimated noise value with the given pixel intensity value.

19 Claims, 4 Drawing Sheets

DETERMINING AN ESTIMATED NOISE VALUE FOR A PIXEL INTENSITY VALUE IN A SET OF IMAGE DATA

CROSS-REFERENCE TO RELATED APPLICATION

This application claims the benefit under 35 U.S.C. § 119(a) and 37 CFR § 1.55 to UK patent application no. 2310942.4, filed on Jul. 17, 2023, the entire content of which is incorporated herein by reference.

TECHNICAL FIELD

The present invention relates to image processing and in particular, estimating noise occurring in an image.

BACKGROUND

Image sensors for capturing images may be present in devices such as digital cameras, mobile phone cameras, and other image capturing devices. Image sensors used to capture images may comprise millions of individual sensor elements for determining an intensity of light arriving on the sensor at each sensor element. Each sensor element represents a pixel. The light intensity information gathered by these sensors may be used to recreate an image captured by the sensor. Light intensity information gathered by these sensors may be susceptible to signal noise which may introduce errors into the light intensity information. Noise may be introduced into light intensity information from several sources. Shot noise, arising due to the quantized nature of light occurs in the photon count of the sensor element and typically has a Poisson distribution. Read noise arises from the electronics in the image sensor and is related to the level of analogue-gain used by the sensor. Read noise typically has a Gaussian distribution.

For various reasons, it is desirable to estimate the noise occurring in an image. For example, when determining whether a high or low pixel intensity value is caused by a compromised sensor element or is merely a noisy pixel, it is desirable to estimate the noise. As another example, an estimated noise value may be used to denoise an image.

In stitched images, a plurality of sets of image data may be captured at different times and/or by different sensors, and combined to form a composite image. Each set of image data may be associated with different image capture characteristics. For example, different exposure values may have been used for the different sets of image data. As a result, a noise value estimated for one set of image data may be inappropriate for another set of image data, in particular for high dynamic range images captured using multiple exposures.

It is desirable to determine an estimated noise value for a given pixel intensity value in stitched image data.

SUMMARY

According to a first aspect of the present invention, there is provided a method of image processing. The method comprises obtaining a set of image data, each set being associated with one or more parameters representative of one or more image capture characteristics for the set and comprising pixel intensity values representing image pixels having respective pixel locations in an image; and for a given pixel intensity value in the set, determining an estimated noise value based on at least: the one or more parameters associated with the set, and a representative intensity value derived from one or more pixel intensity values in the set; and associate the estimated noise value with the given pixel intensity value.

The method may comprise at least one of: based on the estimated noise value, determining whether a particular pixel intensity value in the set of image data comprises a compromised pixel intensity value; based on the estimated noise value, modifying at least one pixel intensity value in the set of image data; or providing the estimated noise value and at least a portion of the set of image data to a computer vision system.

The method may comprise said modifying of at least one pixel intensity value in the set of image data. The modifying may comprise, based on the estimated noise value, either: denoising the at least one pixel intensity value; or correcting the at least one pixel intensity value, wherein the at least one pixel intensity value comprises a defective pixel intensity value.

The representative intensity value may be derived from at least a plurality of proximate pixel intensity values in the set, the plurality of proximate pixel intensity values representing image pixels at pixel locations near the pixel location of a given image pixel that has the given pixel intensity value.

The plurality of proximate pixel intensity values may comprise a plurality of adjacent pixel intensity values representing image pixels at pixel locations adjacent to the pixel location of the given image pixel.

The representative intensity value may be derived using a configured weighting determining a contribution from one of said proximate pixel intensity values, and a contribution from the given pixel intensity value to the representative value may have an effective weighting which is lower than the configured weighting.

The representative intensity value may have substantially no effective contribution from the given pixel intensity value.

The representative intensity value may be derived using a configured weighting determining a contribution from the given pixel intensity value, and a contribution from one of said proximate pixel intensity values to the representative intensity value may have an effective weighting which is lower than the configured weighting.

The representative intensity value may be the given pixel intensity value. This may provide a computationally simple way to derive the representative intensity value.

The one or more parameters may comprise a parameter representing an exposure value used during image capture, and the estimated noise value may be determined based on the parameter representing the exposure value.

The estimated noise value may be determined based on a square root of a function of the parameter representing the exposure value, and the parameter representing the exposure value may be proportional to the exposure value.

The set of image data may have been captured using a pixel array associated with the one or more image capture characteristics, the one or more parameters may comprise a pixel array noise parameter representing noise dependent on the image capture characteristics, and the estimated noise value may be determined based on the pixel array noise parameter.

The pixel array noise parameter may be representative of read noise and/or dark current occurring in the respective pixel array.

The one or more parameters may comprise a shot noise parameter.

The estimated noise value may be determined based on a square root of a function of the representative intensity value, the function being a linear function of the representative intensity value or a linear function of the reciprocal of the representative intensity value.

The estimated noise value may be an estimated noise value for the given pixel intensity value, and determining the estimated noise value may comprise using a first function $\sigma = \sqrt{(aI+b)}$ or an approximation of the first function, wherein $\sigma$ is the estimated noise value and the one or more parameters comprise a and b, or alternatively the estimated noise value may be an estimated noise value for a square root of the given pixel intensity value, and determining the estimated noise value may comprise using a second function $\sigma' = \sqrt{(c/I+d)}$ or an approximation of the second function, wherein $\sigma'$ is the estimated noise value and the one or more parameters comprise c and d, wherein, in either alternative, I is the representative intensity value.

The estimated noise value may be an estimated noise value for the square root of the given pixel intensity value, and determining the estimated noise value may comprise selecting a limiting noise value if the representative intensity value meets a high magnitude condition.

The estimated noise value may be an estimated noise value for the square root of the given pixel intensity value, and determining the estimated noise value may comprise using a linear function which decreases linearly according to the representative intensity value.

The estimated noise value may be an estimated noise value for the square root of the given pixel intensity value, and determining the estimated noise value may comprise selecting a constant noise value if the representative intensity value meets a low magnitude condition.

The method may comprise obtaining a plurality of sets of image data including the set, each set being associated with one or more parameters representative of one or more, respective, image capture characteristics for the set and comprising pixel intensity values representing image pixels having respective pixel locations in an image.

The method may comprise generating a composite image comprising a plurality of output pixels, the plurality of output pixels being associated with a plurality of output pixel intensity values, the output pixel intensity values having been determined from pixel intensity values of at least two of the plurality of sets.

According to a second aspect of the present invention, there is provided a non-transitory computer-readable storage medium comprising instructions which, when executed by a computer, cause the computer to: obtain a set of image data, the set being associated with one or more parameters representative of one or more image capture characteristics for the set and comprising pixel intensity values representing image pixels having respective pixel locations in an image; and for a given pixel intensity value in the set of image data: determine an estimated noise value based on at least: the one or more parameters associated with the set, and a representative intensity value derived from one or more pixel intensity values in the set; and associate the estimated noise value with the given pixel intensity value.

According to a third aspect of the present invention, there is provided an image processing system comprising a data processor and data storage, the data storage comprising instructions which, when executed by the data processor, cause the data processor to: obtain a set of image data, the set being associated with one or more parameters representative of one or more image capture characteristics for the set and comprising pixel intensity values representing image pixels having respective pixel locations in an image; and for a given pixel intensity value in the set of image data: determine an estimated noise value based on at least: the one or more parameters associated with the set, and a representative intensity value derived from one or more pixel intensity values in the set; and associate the estimated noise value with the given pixel intensity value.

Further features and advantages of the invention will become apparent from the following description of preferred embodiments of the invention, given by way of example only, which is made with reference to the accompanying drawings.

DETAILED DESCRIPTION

Details of systems and methods according to examples will become apparent from the following description with reference to the figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further noted that certain examples are described schematically with certain features omitted and/or necessarily simplified for the ease of explanation and understanding of the concepts underlying the examples.

The present invention provides methods for estimating the noise occurring in image data. As will be described below, noise estimates may be used firstly to modify pixel intensity values, for example in image processing techniques such as denoising. Furthermore, they may be used to detect pixel defects, since they provide a benchmark against which variations in pixel intensity value may be measured. The higher the level of noise present in an image, the higher the likelihood that a given pixel, whose intensity value deviates from those of the surrounding pixels, is merely a noisy pixel, rather than a defective pixel.

Figure 1:
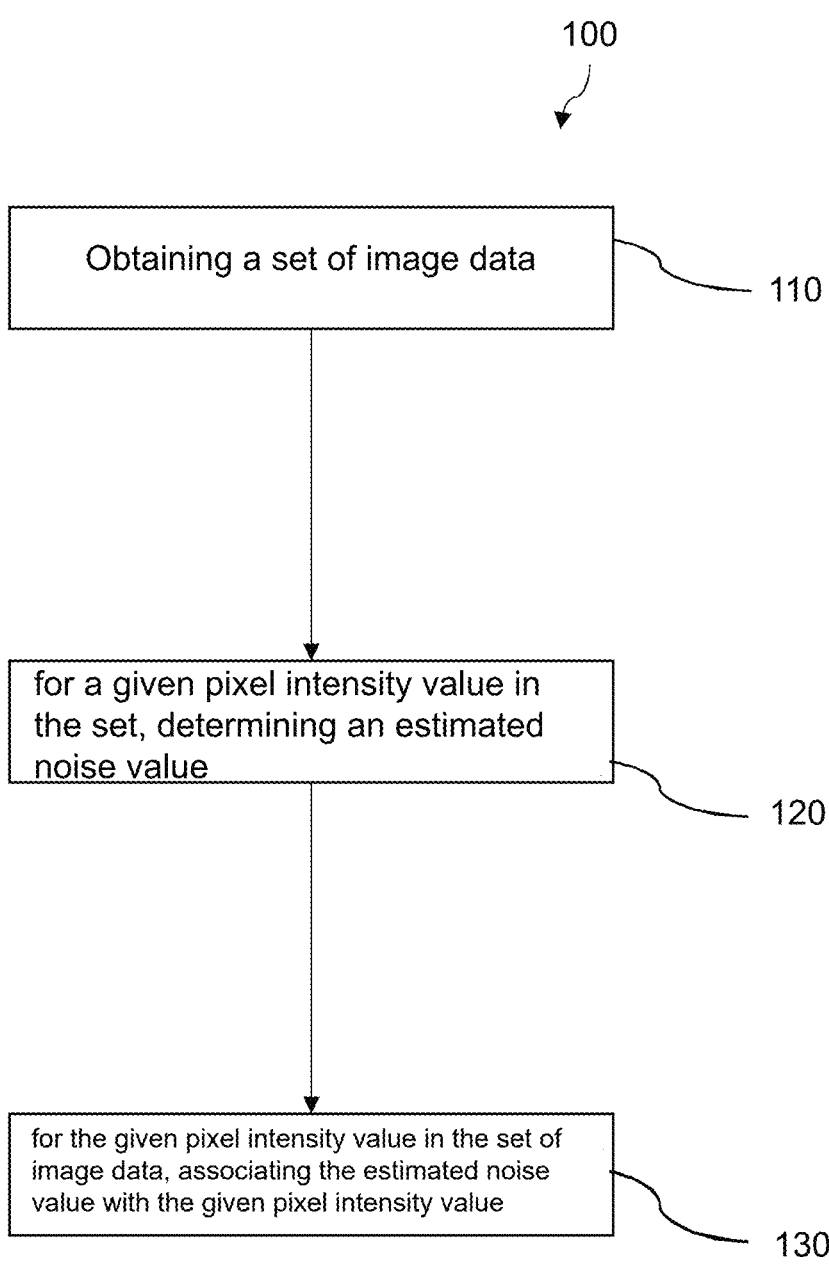
FIG. 1 shows a schematic diagram showing a method of processing image data according to examples.

FIG. 1 shows a flow chart of a method 100 for image processing. The method 100 comprises, at block 110, obtaining a set of image data. The set is associated with one or more parameters representative of one or more image capture characteristics for the set. The set comprises pixel intensity values representing image pixels having respective pixel locations in an image. The set may be referred to as a given set.

Figure 2:
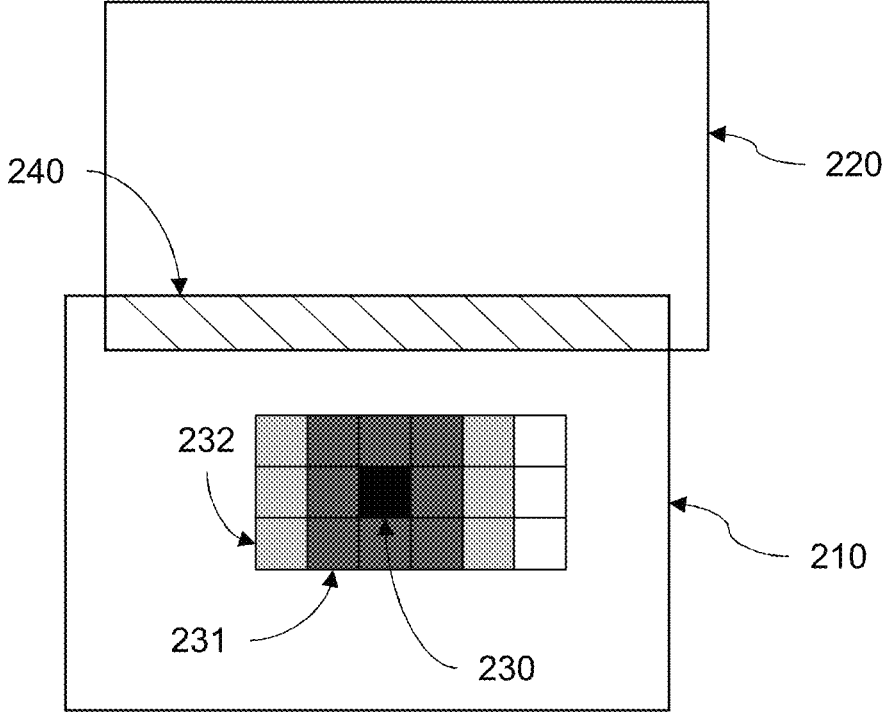
FIG. 2 shows a schematic diagram showing a plurality of sets of image data according to examples.

In some embodiments, the method comprises obtaining a plurality of sets 210, 220 of image data including the set. An example of the plurality of sets 210, 220 is illustrated in FIG. 2. Each set is associated with one or more parameters representative of one or more, respective, image capture characteristics for the set. The one or more, respective, image capture characteristics for the set may comprise one or more, different, respective, image capture characteristics for the set. Each set comprises pixel intensity values representing image pixels having respective pixel locations in an image. By using a representative intensity value derived from an appropriate set of a plurality of sets of image data having respective image capture characteristics, a more appropriate estimated noise value can be determined.

Image sensors may comprise an array of sensor elements, also referred to as sensor pixels. The sensor elements may each comprise a photosensitive element, also called a photosensor, for example a photodiode that can convert incident light into electronic signals or data. The sensor elements may comprise any photosensor suitable for capturing images. Further examples of sensor element photosensitive elements may include charge-coupled devices (CCDs) or complementary metal-oxide semiconductors (CMOSs). When capturing frames of image data, the image sensor may be exposed to incident light for a predetermined period of time, called an exposure interval. Alternatively, the image sensor may be continually exposed to incident light and signals from the sensor may be read over a given period of time which may also be referred to as an exposure interval. During this exposure, incident photons are converted into electrons by the photosensor and the charge may be stored by a capacitor. Each sensor element may further comprise circuitry configured to measure the charge stored by their respective capacitor and to convert the amount of charge stored to a digital value. The pixel intensity values may comprise these digital values. Alternatively, pre-processing may be applied to the digital values to obtain the pixel intensity values, as will be described later. The pixel intensity values may represent at least one characteristic of the light captured by an image sensor. The pixel intensity values may be representative of an amount of light energy incident on each sensor element during the exposure interval, and the amount of light energy may be proportional to the number of photons captured by that sensor element. The pixel intensity values may represent a luminance of captured light, which is for example a measure of the energy per unit area rather than absolute energy. In other examples, the image data may be representative of a brightness of captured light, which may be considered to correspond to a perception of luminance, which may or may not be proportional to luminance. The image data may be representative of any photometric quantity or characteristic that may be used to represent the visual appearance of the images represented by the image data. The image data may be generated and/or stored in any suitable format, for example raw image format.

We now describe sources of noise affecting the pixel intensity values.

The number of photons arriving at a given sensor element during the exposure interval is typically a random value following a Poisson distribution with variance equal to the mean number of photons arriving at the sensor element. The variation caused by this distribution is termed shot noise. Since the variance is equal to the mean for a Poisson distribution, the degree of shot noise occurring varies according to a value representative of the mean number of photons that arrive at the sensor element in the exposure interval. In general, the degree of shot noise occurring is proportional to this notional intensity value. The shot noise may be represented using the following equation:

$$\sigma_S^2 = kI_n.$$

Here, $\sigma_S^2$ is the variance of the amount of energy measured to be incident on the sensor element during the exposure interval caused by shot noise. k is a coefficient which takes account of the sensor response, typically a multiplicative factor equal to the mean proportion of a photon's energy that is converted to electrical energy. $I_n$ is the notional intensity value and has units of energy. The shot noise may in general be approximated as a Gaussian distribution.

Another possible source of noise is dark current. Dark current results from the random creation of electron-hole pairs in the sensor element. Multiple electron-hole pairs may be produced during the exposure interval. Dark current may also be modelled by a Poisson distribution as follows:

$$\sigma_D^2 = mt.$$

Here, $\sigma_D^2$ is the degree of dark current expressed as a variance. m is a proportionality coefficient. m may depend on the temperature of the sensor element. t is the exposure interval. In practice, for typical exposure times and notional intensity values, $\sigma_D^2$ is typically low in comparison with $\sigma_S^2$ and may be ignored. This may not be the case if the exposure value is very high, such as in astrophotography.

A further possible source of noise is read noise. Read noise results from noise occurring in the electronics of the image sensor when the number of photons arriving at the sensor element is converted to an intensity value. Read noise may be modelled by a Gaussian distribution whose variance is independent of intensity and exposure interval, as follows:

$$\sigma_R^2 = f^2.$$

Here, $\sigma_R^2$ is the degree of read noise expressed as a variance. f is a coefficient representative of the read noise.

The method 100 comprises, at block 120, for a given pixel intensity value in the set, determining an estimated noise value. Determining the estimated noise value comprises determining the estimated noise value based on at least the one or more parameters associated with the set, and a representative intensity value. The representative intensity value is derived from one or more pixel intensity values in the set. The values that may be used to determine the estimated noise value are described in detail below. Examples of how to derive the representative intensity value from the one or more pixel intensity values in the set of image data are described in detail below with reference to FIG. 2.

As compared with an estimated noise value that is determined solely from image capture characteristics, an estimated noise value determined based further on the representative intensity value may enable a plurality of noise sources having different dependencies on pixel intensity value to be taken into account. The estimated noise value may thus have improved reliability over a range of pixel intensity values.

Furthermore, as compared with an estimated noise value that is determined solely from pixel intensity values in the set of image data, an estimated noise value determined based further on the image capture characteristics may be a more accurate representation of the noise distribution.

In some examples, the set of image data has been captured using a pixel array associated with the one or more image characteristics. The one or more parameters comprise a pixel array noise parameter representing noise dependent on the image capture characteristics. The pixel array noise parameter may be equal to, or determined from, f and/or m. The pixel array noise parameter may additionally, or alternatively, comprise a pixel surface area. The effect of the pixel surface area on shot noise is similar to the effect of exposure interval on shot noise. The estimated noise value is determined based on the pixel array noise parameter. In these examples, different levels of noise occurring in different pixel arrays may be correctly accounted for during stitching of an image, as described in further detail below. The pixel array noise parameter may be representative of read noise and/or dark current occurring in the respective pixel array. In such cases, different levels of read noise and/or dark current occurring in different pixel arrays may be correctly accounted for in a stitched image.

The one or more parameters may be known from, for example, testing of the image sensor during manufacture. Alternatively, the one or more parameters may be determined experimentally using the method described below with reference to FIG. 3.

The above-mentioned noise sources may collectively be modelled as follows:

$$I_O = I_{true} + p\left(f^2 + kI_{true}\right).$$

Here, $I_O$ is the intensity output by the image sensor. $p(\sigma^2)$ is a probability distribution with mean typically equal to zero and variance equal to $\sigma^2$. $p$ may be a Gaussian distribution. A digital gain may be applied to the intensity output by the image sensor to obtain a gain-enhanced output value. $I_{true}$ is a theoretical intensity value that would be measured if the noise was equal to zero. In this example, dark current is ignored. However, in some examples, dark current may additionally be taken account of.

Where the sets 210, 220 have different exposure values, the gain-enhanced output values may be modified to provide a measure of the rate at which photons arrive at unit area of the sensor element, rather than the number that arrive across the whole sensor element during the exposure interval. The pixel intensity values may be obtained by dividing the gain-enhanced output values by the ratio between an exposure value for the set t to which the gain-enhanced output value belongs and the lowest exposure value to for all of the sets 210, 220. This division scales the standard deviation by $t_0/t$. The exposure value for the set t may take account of any of the exposure interval, an aperture size for the pixel array, the pixel surface area, and a gain factor. In high dynamic range stitched images, the exposure values may differ significantly. The aperture size may refer to the area of an aperture through which light passes on its way to the sensor element. Defining $I_{short} = I_{true}t_0/t$ as the expected intensity that would have been measured if the lowest exposure interval had been used, the standard deviation of the rescaled intensity value is $$\sigma = \sqrt{f^2 \frac{t_0^2}{t^2} + kI_{short}\frac{t_0}{t}}.$$

Thus, in some examples, the one or more parameters comprises a parameter representing an exposure value used during image capture. The estimated noise value is determined based on the parameter representing exposure value.

In these examples, differing exposure values used during image capture of the different sets of image data may be accounted for when determining an estimated noise value. The exposure value may be determined from or be equal to the exposure interval t. The exposure value may additionally or alternatively be determined from or be equal to other values such as aperture size, pixel surface area and gain factor. The estimated noise value may be determined based on a square root of a function of the parameter representing the exposure value, and the parameter representing the exposure value may be proportional to the exposure value. This may allow for a precise accounting of the exposure value in the estimated noise value. The function of the parameter representing exposure value may be a function of the form $$g(t) = \frac{A}{t^2} + \frac{B}{t}$$

where A and B are constants. A and B may be determined using the above equation for the standard deviation of the rescaled intensity value. However, since the functional dependence of the estimated noise value on the exposure depends on the types of noise present, in general, any appropriate function of the parameter representing the exposure value may be used.

Furthermore, in some examples, the one or more parameters comprises a shot noise parameter. The shot noise parameter may be equal to k. More generally, a shot noise parameter may be an estimate of the amount of shot noise occurring for a given pixel intensity value. In these examples, the estimated noise value may account better for shot noise.

In some examples, the estimated noise value is an estimated noise value for the given pixel intensity value. Determining the estimated noise value comprises using a first function $$\sigma = \sqrt{(aI + b)}$$

or an approximation of the first function. $\sigma$ may be equal to the standard deviation of the rescaled intensity value. I is the representative intensity value. The one or more parameters comprise a and b. a may be equal to $kIt_0/t$. b may be equal to $(ft_0/t)^2$. By using the first function or an approximation of the first function, the estimated noise value may take account of both shot noise and read noise. These examples can be readily adapted to take account of dark current.

The pixel intensity values may be large and may occupy an undesirably large amount of memory space. In order to reduce the memory required to perform calculations using the pixel intensity values and/or the estimated noise value, a square-rooting function may be applied to the pixel intensity values. The square-rooting function may further involve multiplication by a constant factor. For example, if the pixel intensity values are represented by 20 bits, and it is desired to represent the pixel intensity values using 12 bits, the pixel intensity values can be multiplied by 16 and then square-rooted. The representative pixel intensity value may be square-rooted according to the square-rooting function. Alternatively, the representative pixel intensity value may be derived from pixel intensity values to which the square-rooting function has been applied. It can be shown that in general the standard deviation of a function of a random variable can be approximated as the standard deviation of the random variable multiplied by the derivative of the function with respect to the random variable. Therefore, the standard deviation $\sigma'$ for the square root of the representative intensity value may be expressed as:

$$\sigma' = \sigma \frac{d\sqrt{I}}{dI} = \frac{\sqrt{aI+b}}{2\sqrt{I}} = \frac{1}{2}\sqrt{a+b/I} = \sqrt{c/I+d}.$$

Thus, as an alternative to the estimated noise value being an estimated noise value for the given pixel intensity value, in some examples, the estimated noise value is an estimated noise value for a square root of the given pixel intensity value. The square root of the given pixel intensity value may be a transformation of the given pixel intensity value using the square-rooting function. In this case, the estimated noise value is an estimate of the standard deviation of the square root of the representative intensity value. Determining the estimated noise value comprises using a second function $$\sigma' = \sqrt{c/I+d}$$

or an approximation of the second function. $\sigma'$ is the estimated noise value. The one or more parameters comprise c and d. I is the representative intensity value. Note that in this function I is the representative intensity value and not the square root of the representative intensity value. I can of course be obtained by squaring the square root of the representative intensity value. The second function is described in further detail with reference to FIG. 3 below. By using the second function or the approximation of the second function, the estimated noise value may take account of both shot noise and read noise, and furthermore, the computational simplicity of performing calculations involving the pixel intensity values and/or the estimated noise value may be improved.

More generally, in some examples, the estimated noise value is determined based on a square root of a function of the representative intensity value, the function being a linear function of the representative intensity value or a linear function of the reciprocal of the representative intensity value. By using such a function of the representative intensity value, the estimated noise value may take account of a wide variety of sources of noise.

However, in any case, since the functional dependence of the estimated noise value depends on the types of noise present, in general, the estimated noise value may be any function of the representative intensity value. For example, noise caused by atmospheric conditions such as air pollution may have a different functional dependence on the representative intensity value to shot noise or read noise.

The method 100 comprises, at step 130, for the given pixel intensity value in the set of image data, associating the estimated noise value with the given pixel intensity value.

Estimated noise values may be determined for each of a group of pixel intensity values in a given set of image data. Estimated noise values may be determined for at least one image pixel in each set of image data. Estimated noise values may be determined for each image pixel in each set of image data. The representative intensity values used to determine the estimated noise value for each image pixel may be different.

Associating the estimated noise value with the given pixel intensity value may comprise creating an index which establishes a link between the given pixel intensity value and the estimated noise value. Such indices may be created for all pixel intensity values for which estimated noise values are determined. An estimated noise value map may be created indicating the estimated noise value at each pixel location.

The estimated noise value has a variety of applications. We describe some such applications.

In some examples, the method 100 comprises, based on the estimated noise value, determining whether a particular pixel intensity value in the set of image data comprises a compromised pixel intensity value. The particular pixel intensity value may comprise the given pixel intensity value. For example, the difference between the particular pixel intensity value and another value may be compared with the estimated noise value to obtain a difference. The other value may be a representative intensity value for the particular pixel intensity value. The particular pixel intensity value may be classified as a defect if, for example, the difference is greater than a predefined multiple of the estimated noise value. Alternatively, if the estimated noise value is known to be of a similar magnitude to or larger than the representative intensity value, the particular pixel intensity value may be classified as a defect if it is greater than a further predefined multiple of the estimated noise value. By determining the estimated noise value based on both the one or more parameters associated with the set and the representative intensity value, a compromised pixel intensity value may be detected more reliably, because the estimated noise value is more reliable and hence the differentiation between pixels that are compromised and pixels that are merely noisy is more reliable.

In some examples, the method 100 comprises, based on the estimated noise value, modifying at least one pixel intensity value in the set of image data.

In some examples, said modifying comprises, based on the estimated noise value, denoising the at least one pixel intensity value. Denoising the at least one pixel intensity value may comprise denoising the given pixel intensity value. For example, the given pixel intensity value may be compared with the representative intensity value. The representative intensity value is intended to provide a measure of what the given pixel intensity value would be if there was no noise. As will be described with reference to FIG. 2, the representative intensity value may be derived from a plurality of adjacent pixel intensity values representing image pixels at pixel locations 231 adjacent to the pixel location 230 of the given image pixel. In such a case, the representative intensity value may provide a measure of what the intensity value is in a region including the pixel location 230 of the given image pixel. Nevertheless, while noise may affect the given pixel intensity value, the given pixel intensity value may differ from the representative intensity value additionally as a result of the luminance of the part of the scene represented by the given pixel intensity value genuinely being different from the luminance of the parts of the scene represented by the adjacent pixel intensity values. As such, it may not be pertinent to simply replace the given pixel intensity value with the representative intensity value. Instead, the denoising may comprise subtracting the estimated noise value from the given pixel intensity value if this results in a value that is still higher than the representative intensity value, or adding the estimated noise value to the given pixel intensity value if this results in a value that is still lower than the representative intensity value. Alternatively, the denoising may comprise replacing the given pixel intensity value with, for example, an interpolated value between the given pixel intensity value and the representative intensity value. The degree of interpolation to be applied may depend on the estimated noise value. If the estimated noise value is higher, the interpolated value may be closer to the representative intensity value. The above examples refer to denoising the given pixel intensity value, but any pixel intensity value in the set can be denoised using the estimated noise value. In any case, a degree of modification to be applied in denoising the at least one pixel intensity value may depend on the estimated noise value. By determining the estimated noise value based on both the one or more parameters associated with the set and the representative intensity value, a degree of correction to be applied when denoising a pixel intensity value may be more robust.

In some examples, said modifying comprises correcting the at least one pixel intensity value, wherein the at least one pixel intensity value comprises a defective pixel intensity value. "Defective" should be taken to have the same meaning as "compromised". For example, the method 100 may comprise the aforementioned determining of whether a particular pixel intensity value in the set of image data comprises a compromised pixel intensity value. The method 100 may comprise replacing the particular pixel intensity value with a replacement value. The replacement value may be the representative value. Alternatively, if the determination that the pixel is defective is uncertain, the replacement value may be an interpolated value, which could be determined using the methods described above.

In some examples, the method 100 comprises providing the estimated noise value and at least a portion of the set of image data to a computer vision system. The computer vision (CV) system may implement CV functionality. CV functionality may include the processing of the portion to extract relatively high-level information describing content of the portion. The CV system may comprise artificial neural networks (ANNs) such as convolutional neural networks (CNN) to extract this information. CV functionality may include performing object detection and/or recognition. CV functionality may include other tasks such as motion estimation, scene reconstruction or image restoration. In some examples, CV functionality includes performing simultaneous localization and mapping (SLAM). SLAM comprises generating and/or updating a map of an environment whilst simultaneously determining and/or tracking a location of a sensor within the environment. SLAM processing may involve identifying and locating objects in the environment, and using those identified objects as semantic "landmarks" to facilitate the accurate and/or efficient mapping of the environment. The estimated noise value can act as a reliability metric when extracting a feature from the portion. The higher the estimated noise value, the less likely a particular feature extracted from the portion is to represent a genuine feature of the scene, rather than an artifact of noise. Therefore, the CV system may, based on the estimated noise value, detect a feature in the portion. Additionally, or alternatively, the CV system may reject the detection of a detected feature in the portion. Additionally, or alternatively, the CV system may determine whether to classify a feature of the portion. By providing the estimated noise value to the computer vision system, the computer vision system may be able to avoid detecting features which result from noise artifacts.

FIG. 2 shows schematically a plurality of sets 210, 220 of image data according to some embodiments. The plurality of sets 210, 220 of image data may have been captured at different, respective, times using the same pixel array. In such a case, the respective image characteristics may comprise respective exposure values. Alternatively, the sets 210, 220 of image data may have been captured using different, respective, pixel arrays.

In some examples, the representative intensity value is the given pixel intensity value. This may provide a computationally simple way to derive the representative intensity value.

However, in some applications, it is preferable to derive the representative intensity value additionally or alternatively from other pixel intensity values in the set of image data. For example, where the given pixel intensity value is a compromised pixel intensity value, the given pixel intensity value may not be representative of the number of photons arriving at the sensor element during the exposure interval. A compromised pixel intensity value may be caused by a defective sensor element. A defective sensor element may cause a constant pixel intensity value to be outputted irrespective of the number of photons arriving at the sensor element during the exposure interval. Types of defect include hot pixels, dead pixels and stuck pixels. A compromised pixel intensity value is to be distinguished from a non-compromised pixel intensity value whose value deviates by a large amount from the expected value merely by virtue of noise. Where the estimated noise value is used to detect that the given pixel intensity value is in fact a compromised pixel intensity value, as described above with reference to FIG. 1, the estimated noise value may not be representative of expected noise if it is derived only from the given pixel intensity value, because the given pixel intensity value is compromised.

Thus, in some examples, the representative intensity value is derived from at least a plurality of proximate pixel intensity values in the set. The plurality of proximate pixel intensity values represent image pixels at pixel locations 231, 232 near the pixel location 230 of a given image pixel that has the given pixel intensity value. The pixel locations 231, 232 near the pixel location 230 as indicated in FIG. 2 are for illustration purposes only. The pixel locations 231, 232 near the pixel location 230 of the given image pixel may, for example, comprise pixel locations within a predefined region including the given image pixel or within a predefined range of the given image pixel. In some examples, only the pixel intensity values in the predefined region or the predefined range having an intensity value that is within a predefined tolerance of the given pixel intensity value may be selected to be the proximate pixel intensity values. The representative intensity value may comprise a mean intensity value of the proximate pixel intensity values. Alternatively, the representative value may comprise a median intensity value of the proximate pixel intensity values. By deriving the representative intensity value from a plurality of pixel intensity values, the effects of noise and/or compromised pixel intensity values on the representative intensity value may be mitigated. The plurality of proximate pixel intensity values are more likely to represent parts of a scene with brightness or luminance similar to the part represented by the given pixel intensity value, than pixel intensity values representing image pixels having pixel locations that are not near the pixel location 230 of the given image pixel. By deriving the representative intensity value from the plurality of proximate pixel intensity values, the representative intensity value may more accurately represent the brightness of the part of the scene represented by the given pixel intensity value.

In some examples, the plurality of proximate pixel intensity values comprises a plurality of adjacent pixel intensity values representing image pixels at pixel locations 231 adjacent to the pixel location of the given image pixel. The representative intensity value may be derived from the plurality of adjacent pixel intensity values. The pixel locations 231 adjacent to the pixel location 230 of the given image pixel may comprise, in a square-grid arrangement of pixel locations, any combination of the four nearest pixel locations, or any combination of the eight nearest pixel locations. The pixel locations 231, 232 adjacent to the pixel location 230 of the given image pixel may comprise all of the eight nearest pixel locations. By deriving the representative intensity value from adjacent pixel intensity values, the representative intensity value may more accurately represent the brightness of the part of the scene represented by the given pixel intensity value.

In some examples, the representative intensity value is derived using a configured weighting determining a contribution from one of said proximate pixel intensity values. A contribution from the given pixel intensity value to the representative value has an effective weighting which is lower than the configured weighting. The representative intensity value may be derived using a plurality of configured weightings determining respective contributions from each of said proximate pixel intensity values. The representative intensity value may be derived by taking a weighted average of the proximate pixel intensity values, and optionally the given pixel intensity value, using the configured weightings. The effective weighting for the given pixel intensity value may be lower than each of the plurality of configured weightings. In some examples, the representative intensity value has substantially no effective contribution from the given pixel intensity value. The representative intensity value may have zero effective contribution from the given pixel intensity value. It may have a weight of zero, or alternatively, no weight is used for the given pixel intensity value. By effectively eliminating the contribution of the given pixel intensity value to the representative value, the reliability of a determination that the given pixel intensity value is compromised may be improved.

In other examples, the representative intensity value is derived using a configured weighting determining a contribution from the given pixel intensity value. A contribution from one of said proximate pixel intensity values to the representative intensity value has an effective weighting which is lower than the configured weighting. An effective contribution from each of said proximate pixel intensity values to the representative intensity value may have a weighting which is lower than the configured weighting. By reducing the contribution of the proximate pixel intensity values to the representative intensity value, the representative intensity value may more accurately represent the brightness of the part of the scene represented by the given pixel intensity value. For example, where the brightness of the scene in the region around the part of the scene represented by the given pixel intensity value is highly non-uniform, it may be pertinent to reduce the contribution to the representative intensity value of one or more of the proximate pixel intensity values.

Any two or more of the sets 210, 220 of image data may comprise an overlapping region 240. The overlapping region 240 comprises a part of a scene which is represented by at least one image pixel from each of two or more sets 210, 220 of image data. The overlapping region 240 may comprise substantially the entirety of each of the sets 210, 220 of image data. For example, for high dynamic range scenes, the same image sensor may be used to capture the plurality of sets 210, 220 of image data at different times, using different exposure values for each set of image data, each set of image data representing the same scene. Alternatively, an overlapping region 240 may occur where an image sensor used to capture two sets 210, 220 of image data has moved and/or rotated between capture of the two sets 210, 220 of image data. This may happen, for example, if the image sensor is fixed to a moving vehicle when the two sets 210, 220 of image data are captured, or if the image sensor is used to take a panoramic picture. To provide a single image, it may be necessary to stitch the two sets 210, 220 of image data together.

In some examples, the method 100 comprises generating a composite image comprising a plurality of output pixels, the plurality of output pixels being associated with a plurality of output pixel intensity values, the output pixel intensity values having been determined from pixel intensity values of at least two of the plurality of sets 210, 220. The composite image may comprise other pixels whose intensity values are each determined from only one of the sets 210, 220. The plurality of output pixels may represent an overlapping region 240 of the at least two sets. The at least two sets 210, 220 may comprise a first set 210 comprising a first pixel intensity value, and a second set 220 comprising a second pixel intensity value, wherein the first pixel intensity value and the second pixel intensity value jointly represent a part of a scene. The plurality of output pixel intensity values may comprise a joint pixel intensity value determined from the first pixel intensity value and the second pixel intensity value. The method 100 may comprise determining, for the first pixel intensity value, a first estimated noise value according to the methods described herein. The method 100 may comprise determining, for the second pixel intensity value, a second estimated noise value according to the methods described herein. The method 100 may comprise determining a joint estimated noise value based on the first estimated noise value and the second estimated noise value. Determining the joint estimated noise value may comprise calculating the square root of the sum of the square of the first estimated noise value with the square of the second estimated noise value. The method 100 may comprise associating the joint estimated noise value with the joint pixel intensity value.

Generating the output pixels may comprise alpha blending. Alpha blending, or alpha compositing, is generally a process for combining two sets 210, 220 of image data, such as an image of a background and an object, to create the appearance of partial or full transparency. Where the two sets 210, 220 of image data being blended are the same image but represented differently, as for example in the case of the high dynamic range scene described above, alpha blending provides a method for generating a weighted average of the pixel intensity values from the different sets. In the present example, alpha blending can be used to generate a weighted average between a given set of image data and another set of image data. Alpha blending in this way may be performed using the same weightings across the whole of the given set and the other set or may be performed differently for individual pixel locations, or subsets of pixel locations.

Additionally, or alternatively, generating the joint pixel intensity value may comprise selecting one of the first pixel intensity value and the second pixel intensity value. Such selecting may comprise comparing the first pixel intensity value to a first stitching condition for the first set 210, and comparing the second pixel intensity value to a second stitching condition for the second set 220. The stitching conditions may comprise respectively lower and/or upper thresholds. The lower and/or upper thresholds may depend on the exposure value for the set. The upper threshold of a first set 210 may be equal to the lower threshold of the second set 220, for example if the first set 210 is associated with a lower exposure value than the second set 220. Where generating the joint pixel intensity value comprises selecting one of the first pixel intensity value and the second pixel intensity value, determining the joint estimated noise value may comprise selecting the estimated noise value that corresponds to the selected pixel intensity value.

By considering the one or more parameters associated with the set, a more robust noise value may be generated for a pixel in a composite image.

Figure 3:
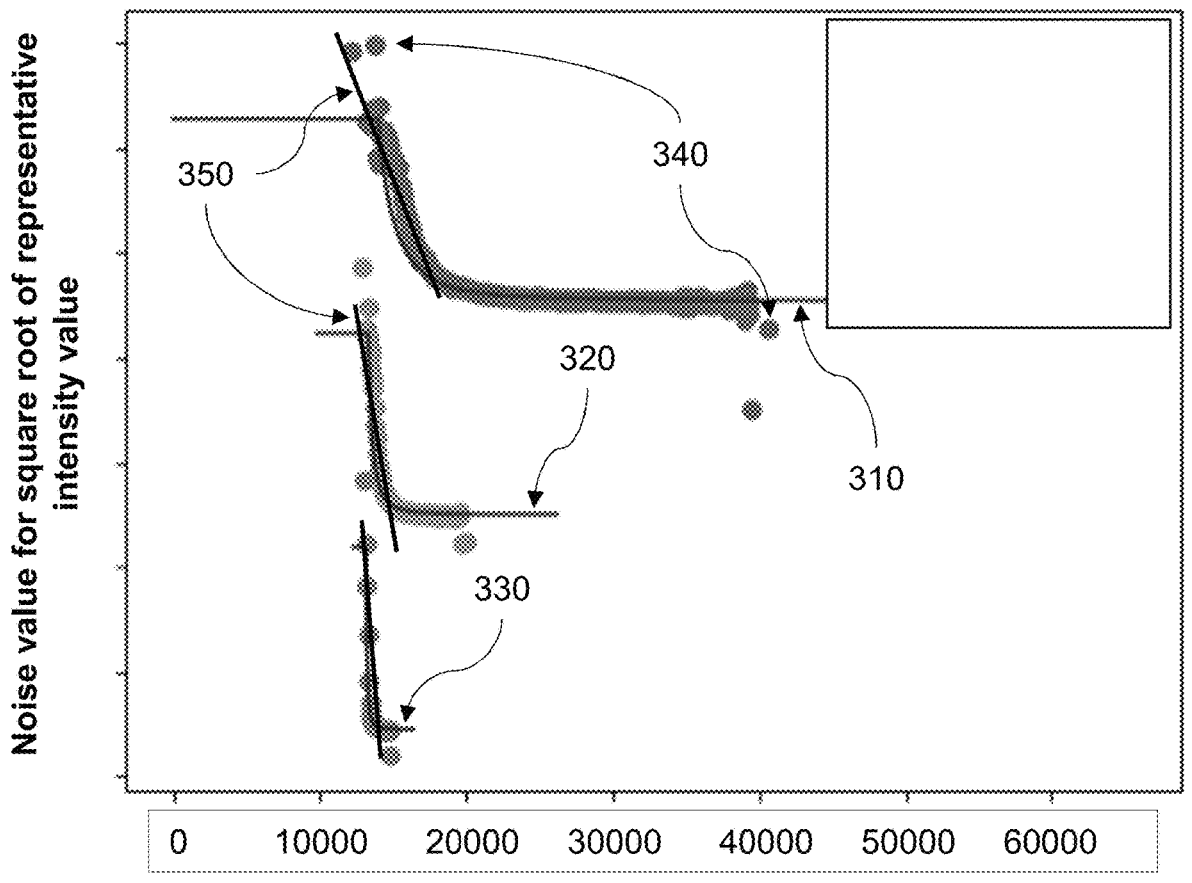
FIG. 3 shows a graph representing a noise value for the square root of a representative intensity value according to examples.

FIG. 3 shows an example graph representing a noise value for the square root of the representative intensity value as a function of the square root of the representative intensity value for three exposure values. The top curve 310, middle curve 320 and bottom curve 330 represent the equation $$\sigma' = \sqrt{c/I + d}$$

for a low exposure value $t_0$, medium exposure value $t_1$ and high exposure value $t_2$ respectively.

The graph also represents experimental measurements 340 of the standard deviation of the square-rooted representative intensity values for the three exposure values. The experimental measurements 340 may be obtained, for example, by first capturing an image of a scene of uniform luminance to obtain pixel intensity values. For each pixel intensity value, a representative intensity value may be determined by taking the mean of a plurality of proximate pixel intensity values, as described with reference to FIG. 2. The representative intensity values may then be square rooted. An experimental noise value may be obtained by measuring the standard deviation of the square rooted representative intensity values. An experimental measurement may be plotted on the graph with y-coordinate equal to the standard deviation, and x-coordinate equal to the square root of the mean of the representative intensity values. This process may be repeated for a range of luminances and exposure values to obtain the experimental measurements 340.

The top curve 310, middle curve 320 and bottom curve 330 may be obtained by fitting respectively curves through the experimental measurements 340 for the low exposure value, medium exposure value and high exposure value, following the equation $$\sigma' = \sqrt{c/I + d}.$$

The coefficients c and d are equal to $(ft_0/2t_n)^2$ and $kt_0/4t_n$ respectively, where $t_n = t_0$, $t_1$, and $t_2$ for the low exposure value, the medium exposure value and the high exposure value respectively. The value $t_0/t_n$ is typically known from the set-up of the image sensor, but may be determined using the above-described curve fitting. The values k and f can be determined using the above-described curve fitting, but may be known.

It should be noted that the value of $\sigma'$ approaches d as I increases. Thus, if read noise is ignored, the noise may be approximated for large values of I as being independent of I. The present invention, which uses the representative intensity value/to determine the estimated noise value, may generate a noise estimate which is not only more accurate for all intensity values, but also which can estimate the noise over a larger range of intensity values, as it is more reliable in the range where c/I is not small compared with d. Nevertheless, where it is determined that I exceeds a threshold, the approximation of a limiting noise value may be used.

In some examples, the estimated noise value is an estimated noise value for a square root of the given pixel intensity value, and determining the estimated noise value comprises selecting a limiting noise value if the representative intensity value meets a high magnitude condition. Meeting a high magnitude condition may comprise exceeding a threshold. The threshold may be substantially equal to d. More generally, the high magnitude condition and/or the limiting noise value may be determined from the one or more parameters. For example, the high magnitude and/or the limiting noise value may be determined from the exposure value. Selecting a limiting noise value when the representative intensity value meets a high magnitude condition may provide a computationally simple method for determining an estimated noise value without substantially affecting the accuracy of the estimated noise value.

In some examples, the estimated noise value is an estimated noise value for the square root of the given pixel intensity value, and determining the estimated noise value comprises using a linear function 350 which decreases linearly according to the representative intensity value. The linear function 350 may be used when the high magnitude condition is not met by the representative intensity value. Not meeting the high magnitude condition may comprise being below the threshold. The gradient and/or domain of the linear function 350 may be determined from the one or more parameters. For example, the gradient, vertical axis intercept and/or domain of the linear function 350 may be determined from the exposure value. The linear function may be continuous with the limiting noise value at the threshold. Approximating the estimated noise value using a linear function in this way may provide a computationally simple method for determining an estimated noise value without substantially affecting the accuracy of the estimated noise value.

In some examples, the estimated noise value is an estimated noise value for the square root of the given pixel intensity value, and determining the estimated noise value comprises selecting a constant noise value if the representative intensity value meets a low magnitude condition. Meeting the low magnitude condition may comprise being lower than a further threshold. The low magnitude condition and/or the constant noise value may be determined from the one or more parameters. For example, the low magnitude condition and/or the constant noise value may be determined from the exposure value. The linear function may be continuous with the constant noise value at the further threshold. Selecting a constant noise value at low magnitudes may prevent an uncharacteristically large estimated noise value from being determined, and may improve the accuracy of the estimated noise value.

Figure 4:
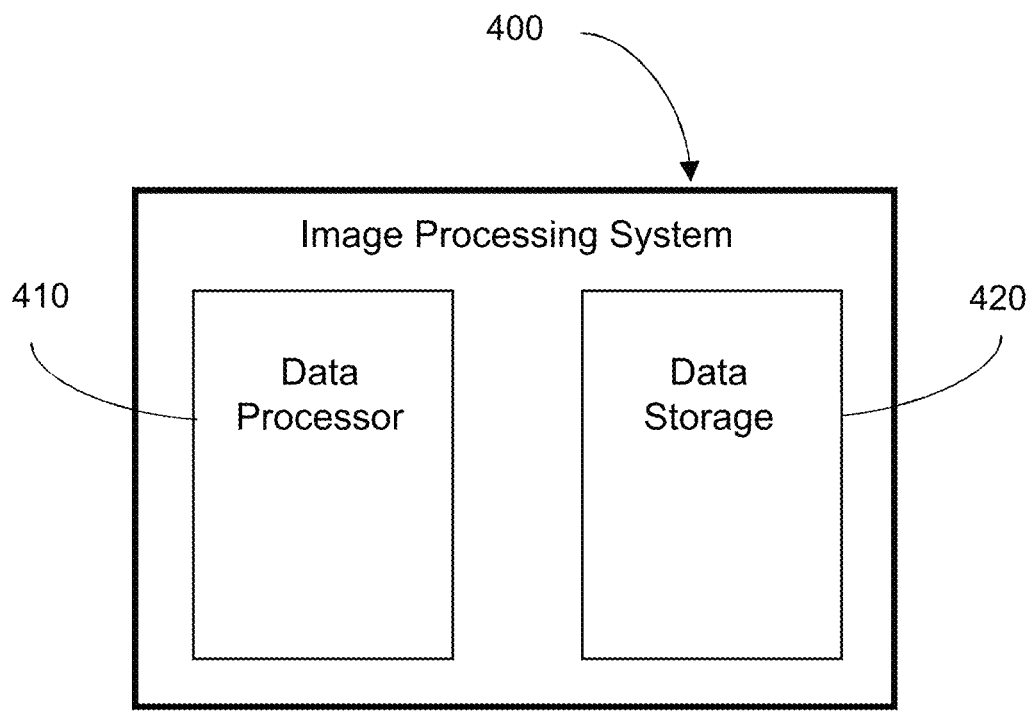
FIG. 4 shows a schematic diagram showing an image processing system according to examples.

FIG. 4 shows image processing system 400 comprising at least one data processor 410 and data storage 420. The data storage 420 includes computer program code comprising instructions, the data storage 420 and the computer program code configured to, with the at least one processor 410, cause the image processing system 400 to perform the method 100 of image processing according to the examples described herein. In particular, the data processor obtains a set of image data, the set being associated with one or more parameters representative of one or more image capture characteristics for the set and comprising pixel intensity values representing image pixels having respective pixel locations in an image. For a given pixel intensity value in set, the data processor determines an estimated noise value based on at least the one or more parameters associated with the set, and a representative intensity value derived from one or more pixel intensity values in the set. The data processor associates the estimated noise value with the given pixel intensity value.

The image processing system 400 may be comprised in a suitable computing device, such as a smart telephone, a digital camera, or a computer. In some examples, the image processing system 400 is located in device comprising at least one image sensor for generating one or more frames of image data. In other examples, the image processing system 400 may be comprised in a computing device without image capturing capabilities but which may be communicatively coupled to an image capture device. The image processing system 400 may be communicatively coupled to an image capture device over a local area network or a wide area network by any suitable wired or wireless communication means. The image processing system 400 may be an application specific integrated circuit. The application specific integrated circuit may include any number of processors, microprocessor, and/or memory blocks, including RAM, ROM, EEPROM, or flash memory. The application specific integrated circuit may comprise an image signal processor, configured to process image data according to the method 100 described herein. Alternatively, the image processing system 400 may be a non-specific computing device such as, for example, a desktop computer, or mobile computing device, configured to perform the method 100 as described above.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of image processing comprising:
obtaining a plurality of sets of image data, the sets being representative of images for stitching together to form a composite image, the sets being associated with one or more, respective, parameters representative of one or more image capture characteristics and comprising pixel intensity values representing image pixels having respective pixel locations in the respective image; and
for a given pixel intensity value in each set:
determining an estimated noise value based on at least:
the one or more parameters associated with the set, and
a representative intensity value derived from one or more pixel intensity values in the set; and
associating the estimated noise value with the given pixel intensity value.

2. The method of claim 1, comprising at least one of:
based on a said estimated noise value, determining whether a particular pixel intensity value in the set of image data comprises a compromised pixel intensity value;
based on a said estimated noise value, modifying at least one pixel intensity value in the set of image data; or
providing a said estimated noise value and at least a portion of the set of image data to a computer vision system.

3. The method of claim 2, comprising said modifying of at least one pixel intensity value in the set of image data, wherein said modifying comprises, based on the said estimated noise value, either:
denoising the at least one pixel intensity value; or
correcting the at least one pixel intensity value, wherein the at least one pixel intensity value comprises a defective pixel intensity value.

4. The method of claim 1, wherein the representative intensity value is derived from at least a plurality of proximate pixel intensity values in the set, the plurality of proximate pixel intensity values representing image pixels at pixel locations near the pixel location of a given image pixel that has the given pixel intensity value.

5. The method of claim 4, wherein the plurality of proximate pixel intensity values comprises a plurality of adjacent pixel intensity values representing image pixels at pixel locations adjacent to the pixel location of the given image pixel.

6. The method of claim 4, wherein
the representative intensity value is derived using a configured weighting determining a contribution from one of said proximate pixel intensity values, and
a contribution from the given pixel intensity value to the representative value has an effective weighting which is lower than the configured weighting.

7. The method of claim 6, wherein the representative intensity value has substantially no effective contribution from the given pixel intensity value.

8. The method of claim 4, wherein
the representative intensity value is derived using a configured weighting determining a contribution from the given pixel intensity value, and
a contribution from one of said proximate pixel intensity values to the representative intensity value has an effective weighting which is lower than the configured weighting.

9. The method of claim 1, wherein the representative intensity value is the given pixel intensity value.

10. The method of claim 1, wherein the one or more, respective, parameters comprise a parameter representing an exposure value used during image capture, and a said estimated noise value is determined based on the parameter representing the exposure value.

11. The method of claim 10, wherein the said estimated noise value is determined based on a square root of a function of the parameter representing the exposure value, and the parameter representing the exposure value is proportional to the exposure value.

12. The method of claim 1, wherein
the set of image data has been captured using a pixel array associated with the one or more image capture characteristics,
the one or more parameters comprise a pixel array noise parameter representing noise dependent on the image capture characteristics, and
the estimated noise value is determined based on the pixel array noise parameter.

13. The method of claim 12, wherein the pixel array noise parameter is representative of read noise and/or dark current occurring in the respective pixel array.

14. The method of claim 1, wherein a said estimated noise value of the estimated noise values is determined based on a square root of a function of the representative intensity value, the function being a linear function of the representative intensity value or a linear function of the reciprocal of the representative intensity value.

15. The method of claim 14, wherein:

the said estimated noise value is an estimated noise value for the given pixel intensity value, and determining the said estimated noise value comprises using a first function $$\sigma = \sqrt{(aI + b)}$$

an approximation of the first function, wherein $\sigma$ is the estimated noise value and the one or more parameters comprise a and b, or alternatively the said estimated noise value is an estimated noise value for a square root of the given pixel intensity value, and determining the said estimated noise value comprises using a second function $$\sigma' = \sqrt{(c/I + d)}$$

or an approximation of the second function, wherein $\sigma'$ is the estimated noise value and the one or more parameters comprise c and d, wherein, in either alternative, I is the representative intensity value.

16. The method of claim 15, wherein the said estimated noise value is an estimated noise value for the square root of the given pixel intensity value, and determining the estimated noise value comprises selecting a limiting noise value if the representative intensity value meets a high magnitude condition.

17. The method of claim 1, comprising generating the composite image, the composite image comprising a plurality of output pixels, the plurality of output pixels being associated with a plurality of output pixel intensity values, the output pixel intensity values having been determined from pixel intensity values of at least two of the plurality of sets.

18. A non-transitory computer-readable storage medium comprising instructions which, when executed by a computer, cause the computer to:

obtain a plurality of sets of image data, the sets being representative of images for stitching together to form a composite image, the sets being associated with one or more, respective, parameters representative of one or more image capture characteristics and comprising pixel intensity values representing image pixels having respective pixel locations in the respective image; and for a given pixel intensity value in each set:

determine an estimated noise value based on at least:
the one or more parameters associated with the set, and
a representative intensity value derived from one or more pixel intensity values in the set; and associate the estimated noise value with the given pixel intensity value.

19. An image processing system comprising a data processor and data storage, the data storage comprising instructions which, when executed by the data processor, cause the data processor to:

obtain a plurality of sets of image data, the sets being representative of images for stitching together to form a composite image, the sets being associated with one or more, respective, parameters representative of one or more image capture characteristics and comprising pixel intensity values representing image pixels having respective pixel locations in the respective image; and for a given pixel intensity value in each set:

determine an estimated noise value based on at least:
the one or more parameters associated with the set, and
a representative intensity value derived from one or more pixel intensity values in the set; and associate the estimated noise value with the given pixel intensity value.

* * * * *